(12) United States Patent
Kawada

(10) Patent No.: US 7,692,739 B2
(45) Date of Patent: Apr. 6, 2010

(54) LIQUID CRYSTAL PANEL AND METHOD OF REPAIRING SAME

(75) Inventor: Yoshitaka Kawada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 664 days.

(21) Appl. No.: 11/485,298

(22) Filed: Jul. 13, 2006

(65) Prior Publication Data
US 2007/0013831 A1   Jan. 18, 2007

(30) Foreign Application Priority Data

Jul. 14, 2005   (JP)   ............................. 2005-205339

(51) Int. Cl.
*G02F 1/1335*   (2006.01)
(52) U.S. Cl. ...................... 349/106; 349/104
(58) Field of Classification Search ................. 349/107
See application file for complete search history.

(56) References Cited

U.S. PATENT DOCUMENTS 7,075,600 B2 *   7/2006   Song et al. ................... 349/107
2005/0213022 A1   9/2005   Kawada

FOREIGN PATENT DOCUMENTS

| CN | 1466703 A | 1/2004 |
|---|---|---|
| JP | 60-243635 | 12/1985 |
| JP | 5-313167 | 11/1993 |
| JP | 6-51314 | 2/1994 |
| JP | 8-15660 | 1/1996 |
| JP | 8-201813 | 8/1996 |
| JP | 10-260419 | 9/1998 |
| JP | 2002-148605 | 5/2002 |
| JP | 2003-262842 | 9/2003 |

* cited by examiner

*Primary Examiner*—Kevin S Wood
(74) *Attorney, Agent, or Firm*—Oblon, Spivak, McClelland, Maier & Neustadt, L.L.P.

(57) ABSTRACT

A liquid crystal panel comprises: a first substrate on which pixels of a plurality of colors are arranged; a second substrate; and a liquid crystal sandwiched between the first substrate and the second substrate. On a surface of at least one of the first and second substrates in contact with the liquid crystal, a concave portion is formed in at least a portion of the pixel of a color having the highest relative luminosity among the pixels of the plurality of colors. Alternatively, on a surface of at least one of the first and second substrates in contact with the liquid crystal, a protrusion is formed corresponding to the contour of the pixel of a color having the highest relative luminosity among the pixels of the plurality of colors.

6 Claims, 22 Drawing Sheets

US 7,692,739 B2

LIQUID CRYSTAL PANEL AND METHOD OF REPAIRING SAME

CROSS-REFERENCE TO RELATED APPLICATIONS

This application is based upon and claims the benefits of priority from the prior Japanese Patent Application No. 2005-205339, filed on Jul. 14, 2005; the entire contents of which are incorporated herein by reference.

BACKGROUND OF THE INVENTION

1. Field of the Invention

This invention relates to a liquid crystal panel and a method of repairing the same, and more particularly to a liquid crystal panel having red (R), green (G), blue (B), or other color pixels and a method of repairing the same.

2. Background Art

Liquid crystal panels are prevailing as screen devices for various home appliances and information terminals including televisions, personal computers, and mobile phones. To meet growing user needs, it is important to increase the screen size and resolution and to reduce the manufacturing cost.

For reducing the cost of an active matrix liquid crystal panel, there is a method of repairing defective pixels by laser light irradiation. For example, a "bright spot defect" occurs due to failure to block transmitted light caused by a TFT (Thin Film Transistor) malfunction and a defect in the pixel electrode or alignment film. The alignment film of pixels having bright spot defects can be irradiated with laser light to disturb the orientation, thereby decreasing the transmittance to reduce the bright spot defect contrast, so that products including such pixels can be commercially used (e.g., JP 5-313167A (1993) and JP 8-015660A (1996)).

SUMMARY OF THE INVENTION

According to an aspect of the invention, there is provided a liquid crystal panel comprising: a first substrate on which pixels of a plurality of colors are arranged; a second substrate; and a liquid crystal sandwiched between the first substrate and the second substrate, on a surface of at least one of the first and second substrates in contact with the liquid crystal, a concave portion being formed in at least a portion of the pixel of a color having the highest relative luminosity among the pixels of the plurality of colors.

According to another aspect of the invention, there is provided a liquid crystal panel comprising: a first substrate on which pixels of a plurality of colors are arranged; a second substrate; and a liquid crystal sandwiched between the first substrate and the second substrate, on a surface of at least one of the first and second substrates in contact with the liquid crystal, a protrusion being formed corresponding to the contour of the pixel of a color having the highest relative luminosity among the pixels of the plurality of colors.

According to another aspect of the invention, there is provided a method of repairing a liquid crystal panel, the liquid crystal panel including a first substrate on which pixels of a plurality of colors are arranged, a second substrate, and a liquid crystal sandwiched between the first substrate and the second substrate, wherein, on a surface of at least one of the first and second substrates in contact with the liquid crystal, a concave portion or a protrusion is formed in at least a portion of the pixel of a color having the highest relative luminosity among the pixels of the plurality of colors, the method comprising: irradiating the pixel of the color having the highest relative luminosity with laser light to disturb the orientation of the liquid crystal.

DETAILED DESCRIPTION OF THE INVENTION

An embodiment of the invention will now be described with reference to the drawings.

Figure 1:
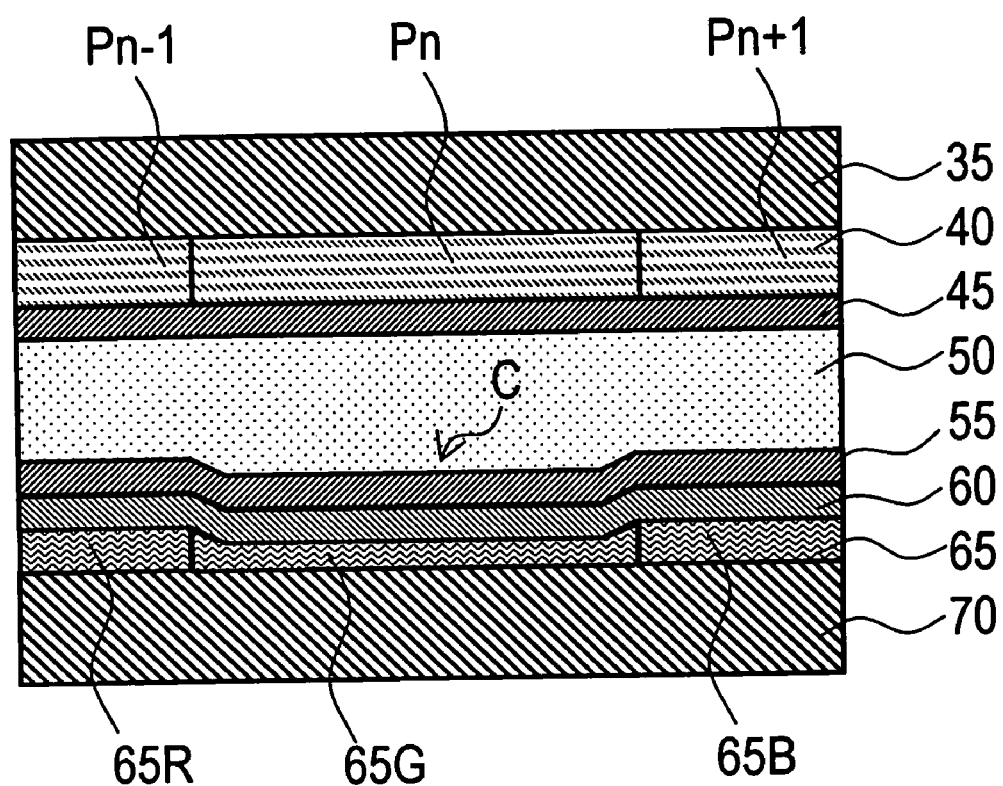
FIG. 1 is a schematic view illustrating the cross section of a liquid crystal panel according to an embodiment of the invention.

FIG. 1 is a schematic view illustrating the cross section of a liquid crystal panel according to this embodiment.

Figure 2:
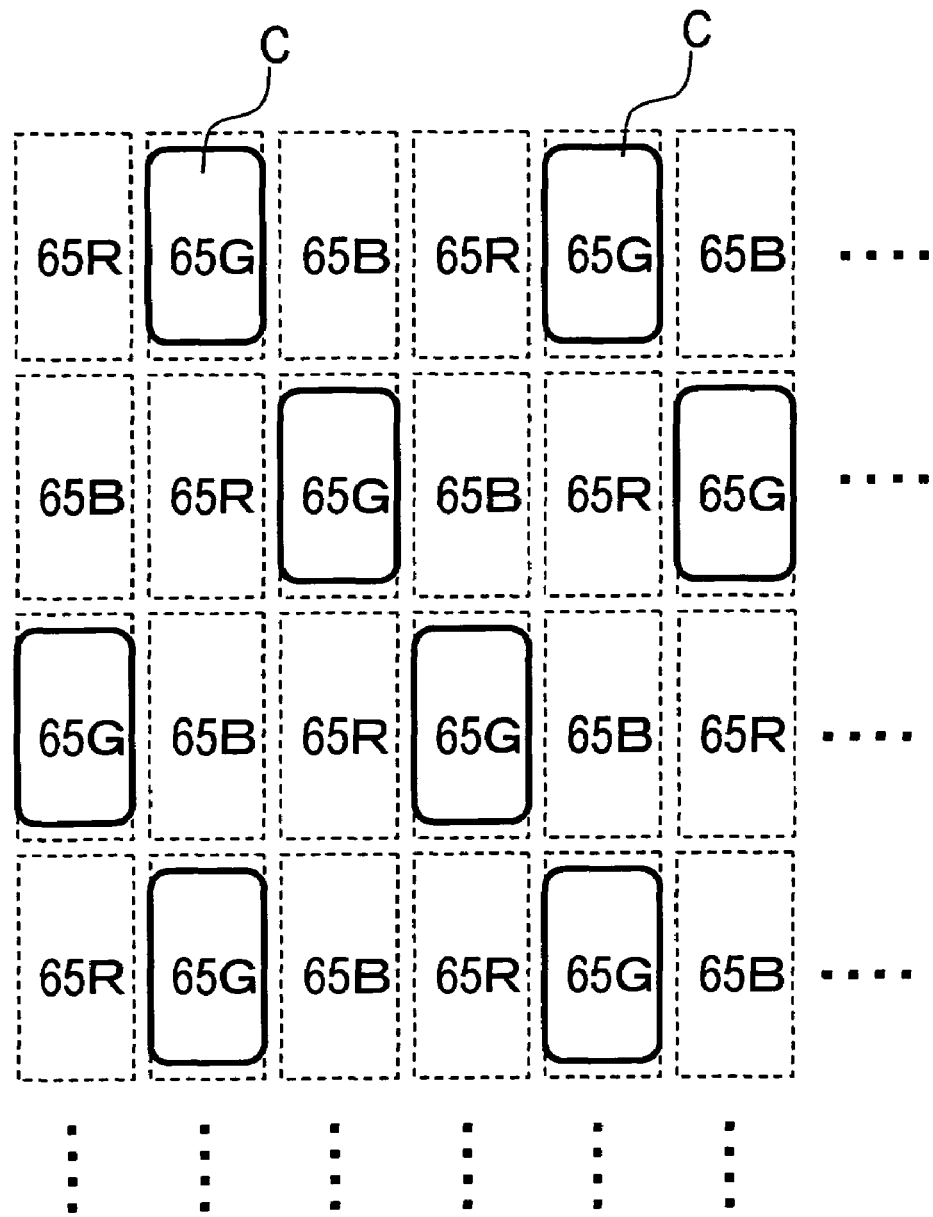
FIGS. 2 and 3 are conceptual diagrams for illustrating the arrangement of pixels of a liquid crystal panel according to the embodiment of the invention.
Figure 3:
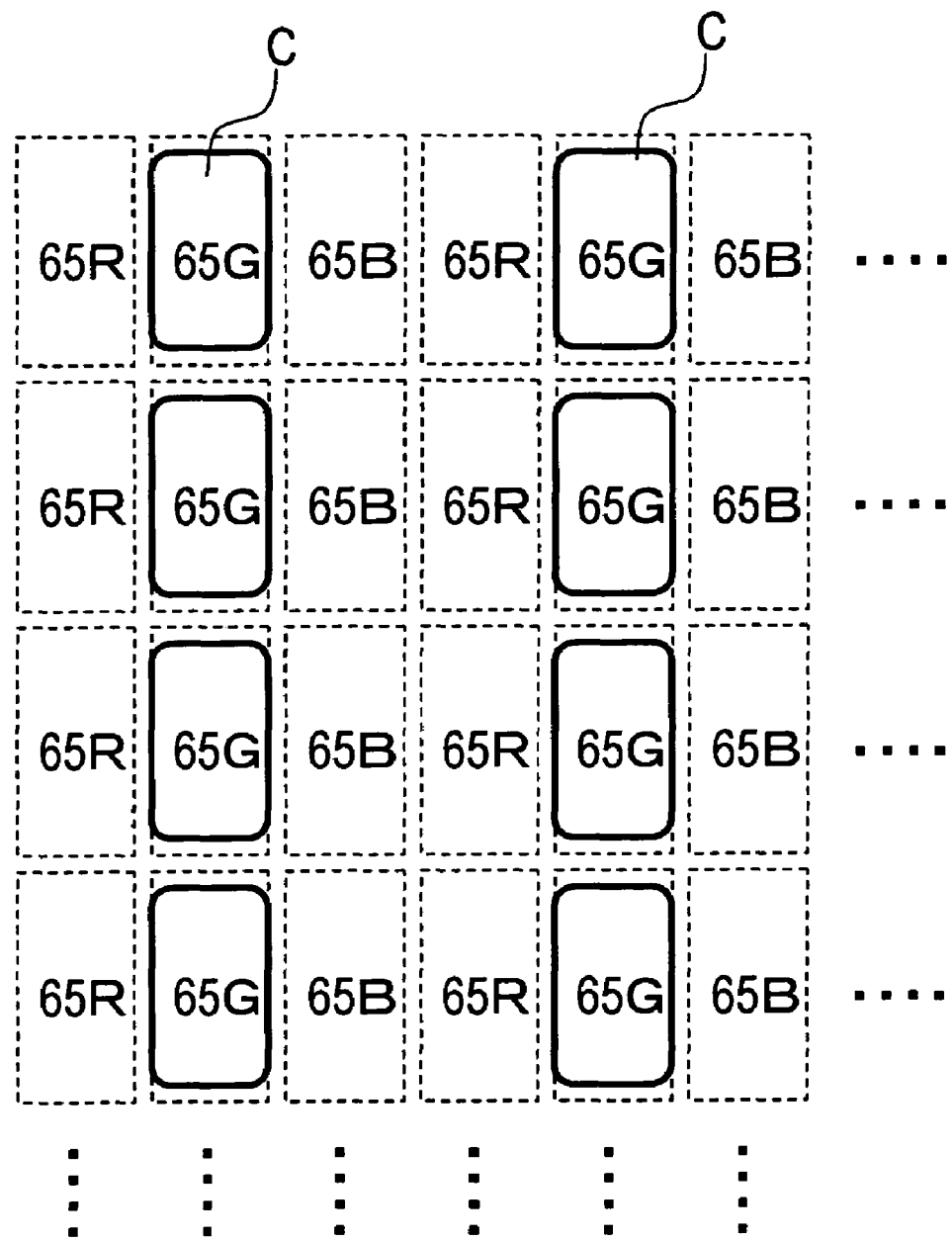

FIGS. 2 and 3 are conceptual diagrams for illustrating the arrangement of pixels thereof.

More specifically, the liquid crystal panel of this example is irradiated with backlight from behind, and the transmitted light is controlled to display a desired image. However, the invention is not limited thereto. For example, the invention can be embodied in the form of reflecting light incident from the front side to display an image.

The liquid crystal panel has a pair of glass substrates 35, 70. A polarizing plate (not shown) is affixed to the outer major surface of each of the glass substrates 35, 70. On the inner major surface of the glass substrate 35 is formed an array region 40, on which an alignment film 45 is formed. The array region 40 serves to apply voltage to the liquid crystal for each pixel and includes, for example, an interconnect layer, a TFT or other switching element, an interlayer insulating film, a planarization region made of resin and the like, and pixel electrodes.

On the opposite side, on the inner major surface of the glass substrate 70, a color filter 65, an opposed electrode 60, an alignment film 55, and the like are laminated in this order. The color filter 65 typically consists of three colors 65R (red), 65G (green), and 65B (blue) corresponding to the three primary colors of light. However, the invention is not limited to this combination, but may be any other combinations of colors. Note that the color filter 65 may be provided above the array region 40. Various arrangements of pixels with such a color filter can be contemplated, including the so-called "striped" arrangement as illustrated in FIG. 3 and the so-called "houndstooth check" arrangement as illustrated in FIG. 2.

The liquid crystal 50 is packed between the alignment films 45 and 55.

In this example, among the three kinds of R, G, and B pixels, the G (green) pixels have a concave portion C. More specifically, the film thickness of the color filter 65G is made thinner than that of the other colors 65R and 65B, and the opposed electrode 60 and the alignment film 55 are formed on the color filter 65G. In FIGS. 2 and 3, the region of each pixel is represented by a dashed line, and the concave portion C is represented by a solid line. Such a concave portion C allows "bright spot defects" or other defects to be reliably remedied when they are repaired by a laser.

More specifically, failures may occur in such a liquid crystal panel during its manufacturing process. For example, if a malfunction occurs in a TFT or other switching element provided in the array region 40, or if a pixel electrode, an alignment film, or the like is not formed normally, then the transmitted light cannot be blocked in the pixel, which may result in a "bright spot defect", where the corresponding portion is always bright.

Such a bright spot defect deteriorates the image quality of the liquid crystal panel. Therefore care is needed not to produce failures during the process of manufacturing the liquid crystal panel. However, it is difficult to manufacture liquid crystal panels free from failures such as bright spot defects at a yield of 100%. On the other hand, if liquid crystal panels having only a single bright spot defect or other failure are discarded as defectives, then the manufacturing cost is increased, and improvement should be made in terms of effective use of resources and energy.

In contrast, the liquid crystal panel of this embodiment is configured so that pixels corresponding to one color have a concave portion C. In particular, it is preferable to form a concave portion C in pixels corresponding to a color of high relative luminosity. For example, when the color filter is composed of three colors R (red), G (green), and B (blue), a concave portion C is provided in G (green) pixels, which have the highest relative luminosity. Thus, when a "bright spot defect" or the like is repaired by a laser in a pixel that is the most conspicuous to the naked eye, it can be repaired by retaining a bubble in that pixel and reliably darkening it.

Figure 4:
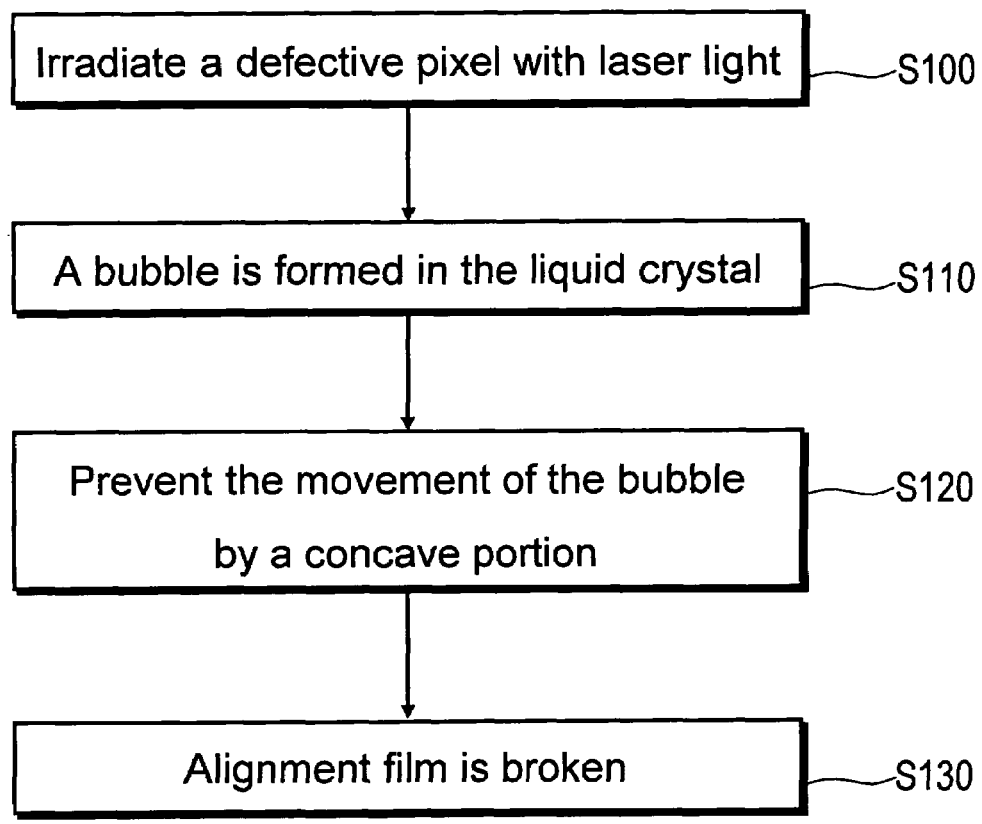
FIG. 4 is a flow chart illustrating the sequence of a method of repairing a liquid crystal panel of the embodiment of the invention.

FIG. 4 is a flow chart illustrating the sequence of a method of repairing a liquid crystal panel of this embodiment.

Figure 5A:
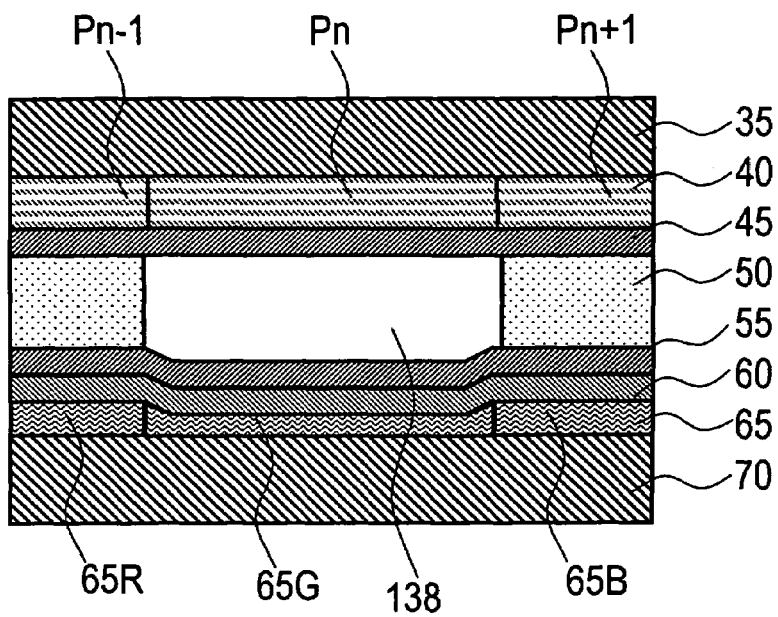
FIGS. 5 and 6 are schematic cross sections for giving a description of repairing a liquid crystal panel of the present embodiment.
Figure 5B:
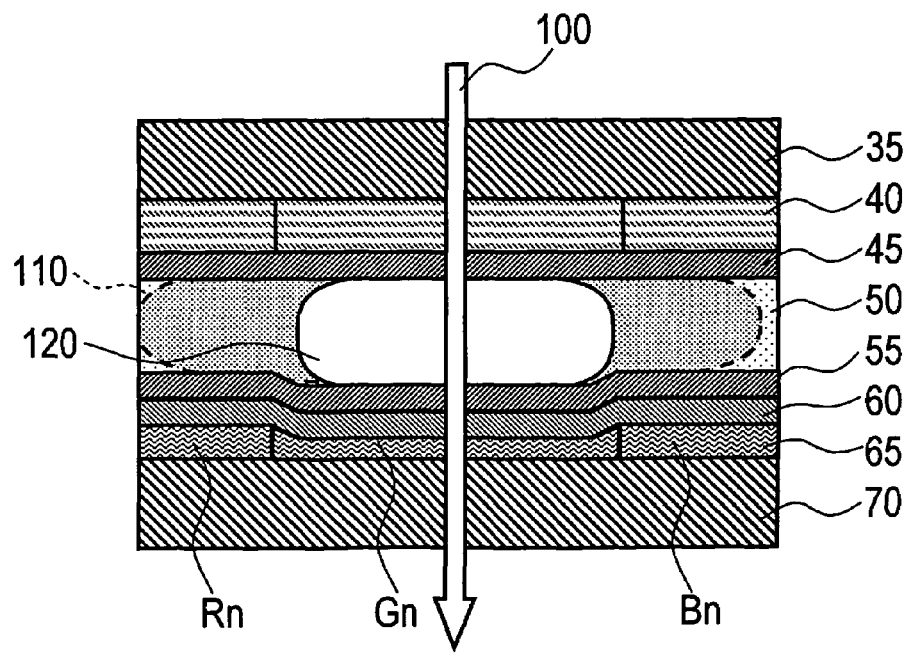

FIGS. 5 and 6 are schematic cross sections for giving a description of repairing a liquid crystal panel of this embodiment.

Figure 7A:
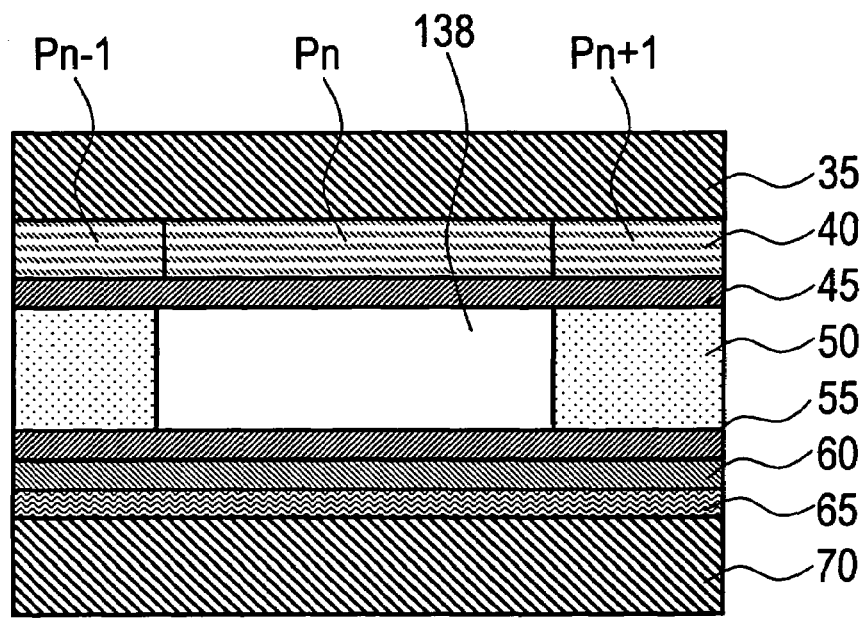
FIGS. 7 and 8 are schematic cross sections for giving a description of applying a similar repairing method to a liquid crystal panel of a comparative example.
Figure 7B:
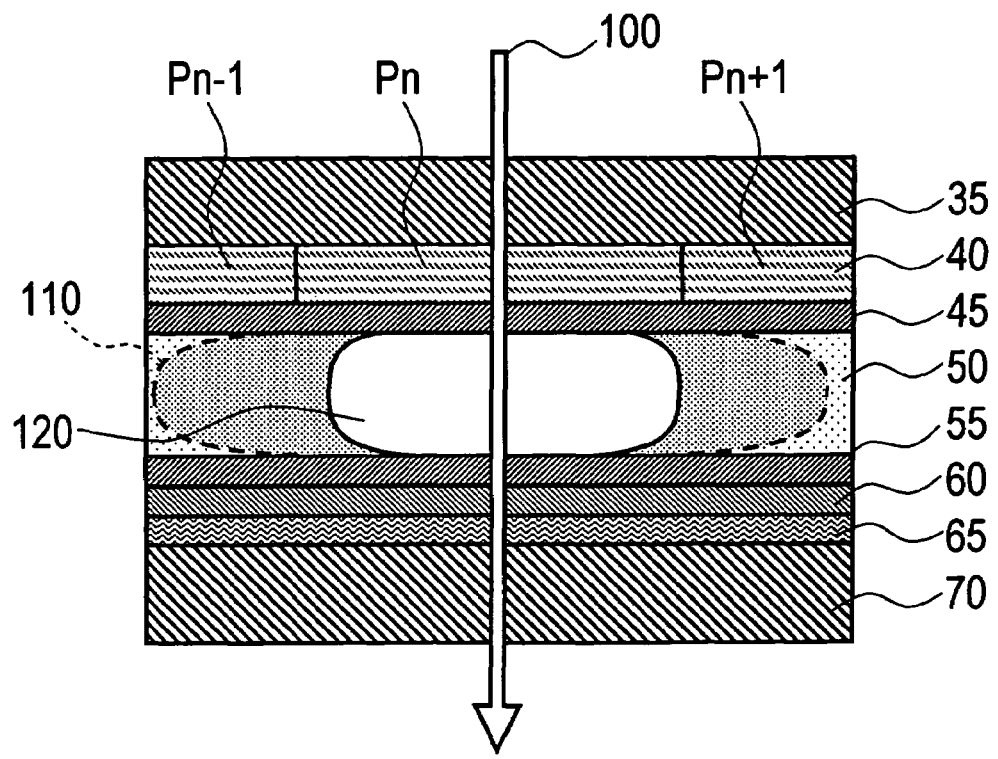
Figure 8A:
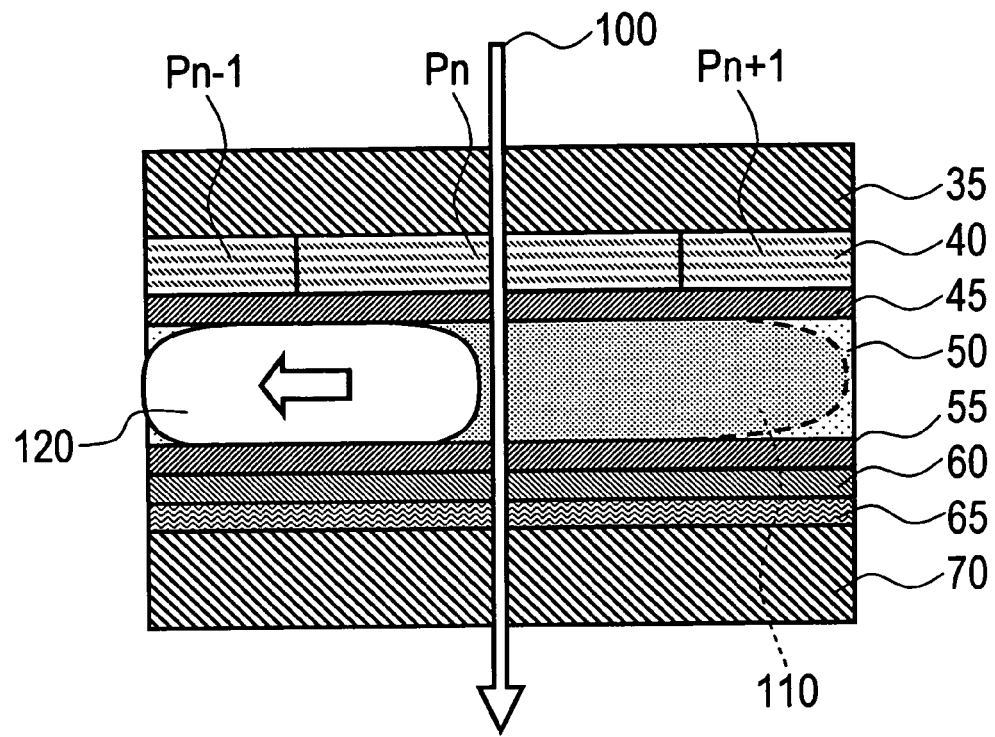

FIGS. 7 and 8 are schematic cross sections for giving a description of applying a similar repairing method to a liquid crystal panel of a comparative example.

More specifically, when the method of repairing by a laser is carried out, a defective pixel of the liquid crystal panel is irradiated with laser light (step S100). It is assumed here that a green pixel Pn has a bright spot defect.

The pixel Pn illustratively has a rectangular shape measuring about tens to hundreds of micrometers on a side. The laser light 100 may illustratively have a spot diameter of about 1 to 10 micrometers and an energy of about 0.1 to 10 microjoules. It may have a pulsed or continuous waveform. It may have a repetition frequency of about 100 to 50000 hertz and a scan speed of about 0.1 mm/sec to 10 mm/min. The source of the laser light 100 may illustratively be a YAG laser having a wavelength of 1064 nanometers, which illustratively has a power of about 1 microjoule.

Upon irradiation with such laser light 100, its energy locally increases the temperature of the liquid crystal 50 at the irradiated portion, which is vaporized. Thus, as shown in FIGS. 5 and 7B, a bubble 120 is formed in the liquid crystal of the defective pixel Pn (step S110). Furthermore, a low viscosity region 110 is formed around the bubble 120, where the liquid crystal 50 has an increased temperature and hence a low viscosity.

Here, the temperature dependence of the viscosity of the liquid crystal 50 is described.

Figure 9:
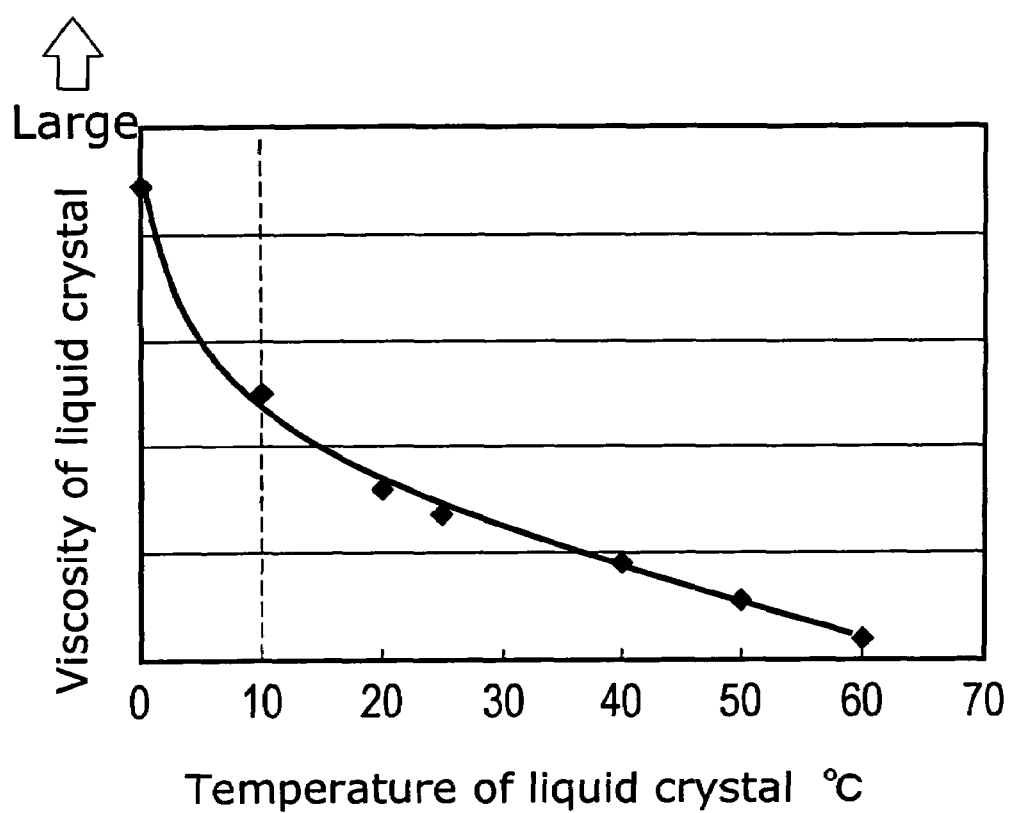
FIG. 9 is a graphical diagram illustrating the temperature dependence of the viscosity of a liquid crystal.

FIG. 9 is a graphical diagram illustrating the temperature dependence of the viscosity of a liquid crystal.

As illustrated in FIG. 9, the viscosity of a liquid crystal tends to asymptotically decrease toward zero with the increase of temperature. It can thus be understood that the irradiation energy of laser light 100 produces a low viscosity region 110.

When a low viscosity region 110 is thus formed, the bubble 120 becomes easy to move toward the surrounding low viscosity region 110. In particular, in the comparative example shown in FIG. 8, the bubble 120 becomes easy to move in the low viscosity region 110 because the alignment films 45, 55 sandwiching the liquid crystal 50 on both sides have a planar surface. If the bubble 120 moves in this way, the irradiated portion 155 irradiated with laser light 100 is covered again with liquid crystal in a liquid state.

Figure 8B:
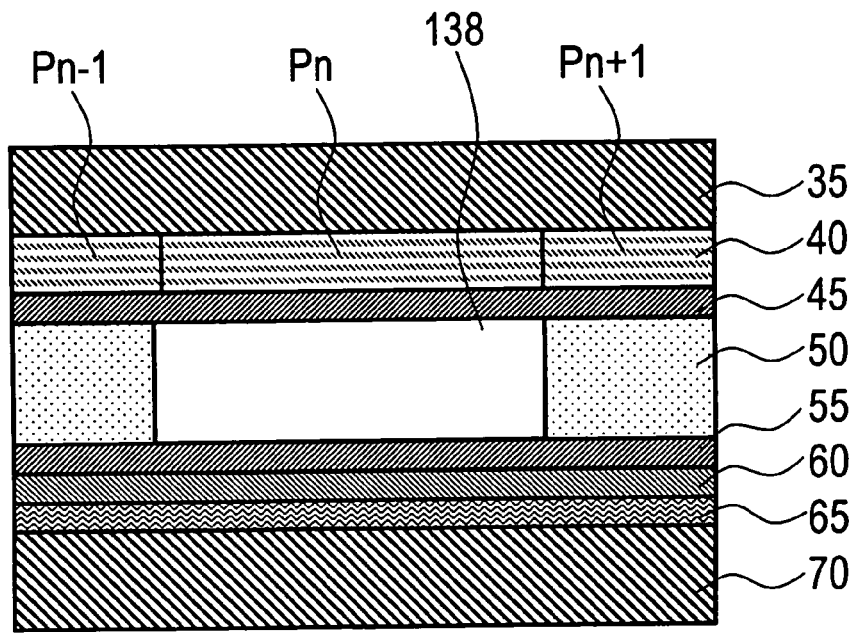

The energy of laser light 100 is then likely to be absorbed by the liquid crystal 50. Furthermore, heat generated in the alignment films 45, 55 at the irradiated portion 155 irradiated with laser light 100 is likely to be absorbed by the liquid crystal 50, which decreases the efficiency of heating. This makes it difficult to break the alignment films 45, 55. Even if the alignment films 45, 55 and the underlying elements such as the array region 40, opposed electrode 60, and color filter 65 are sufficiently heated at the irradiated portion P irradiated with laser light 100, they are difficult to shatter around and unable to produce deposition on the alignment films 45, 55 at the defective pixel Pn because they are covered with the liquid crystal 50. That is, as shown in FIG. 8B, the orientation of the liquid crystal at the defective pixel Pn cannot be efficiently disturbed, which makes it difficult to repair the bright spot defect.

Figure 6A:
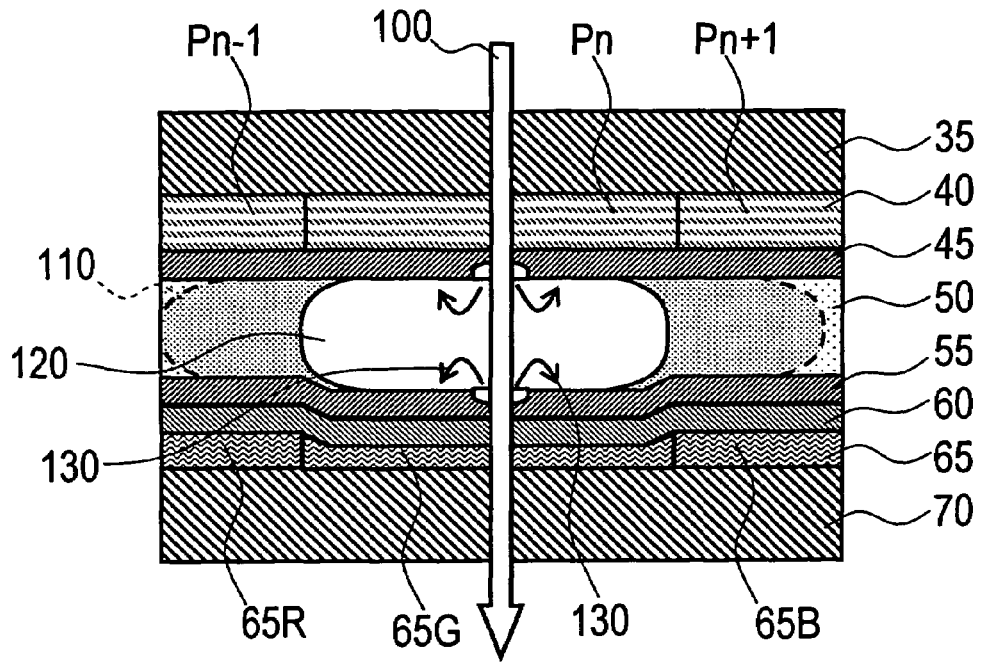
Figure 6B:
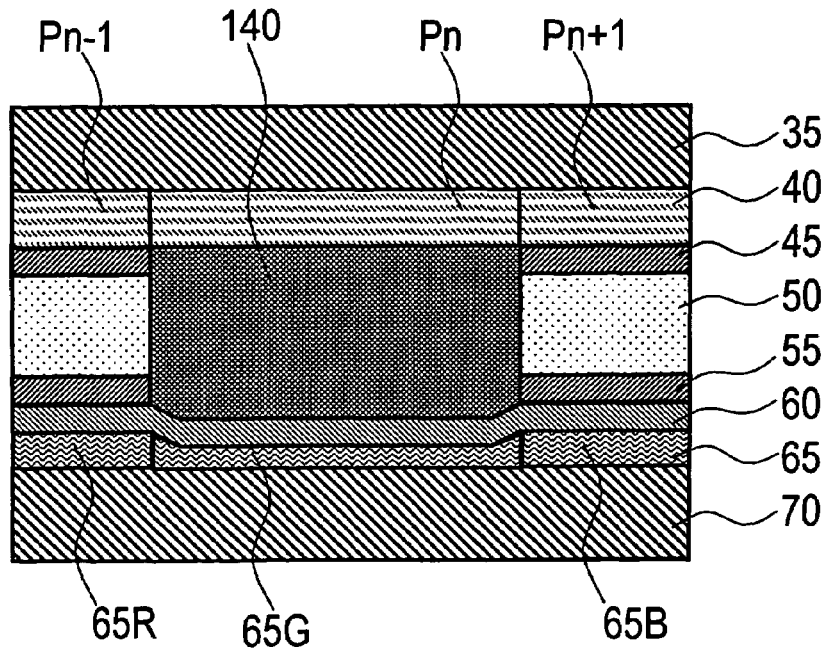

In contrast, according to this embodiment, a concave portion C is provided on the pixel. Thus the bubble 120 is prevented from moving and fixed to the pixel (step S120). That is, the formed bubble 120 is prevented from moving by the step at the edge of the concave portion C, and hence stays between the steps. Then the energy of laser light 100 is not absorbed by the liquid crystal 50 and is efficiently absorbed by the alignment films 45, 55 and other elements provided above and below. As a result, as shown in FIG. 6A, the alignment films 45, 55 are rapidly heated and reliably broken (step S130). Likewise, the array region 40, opposed electrode 60, color filter 65, and other elements underlying the alignment films 45, 55 are efficiently heated and broken. As a result, the orientation effect of the alignment films 45, 55 can be prevented to efficiently disturb the orientation of the liquid crystal at the defective pixel Pn, thereby reliably decreasing the optical transmittance as shown in FIG. 6B. That is, the bright spot defect can be reliably darkened (140) and repaired.

In an experiment made by the inventor for a detailed observation of pixels that are successfully darkened by irradiating the bright spot defect with laser light 100, it is often the case that fine particles with a size of about 0.1 micrometer or less are uniformly deposited on the surface of the array substrate and the opposed substrate (the surface in contact with the liquid crystal 50). However, in the comparative example described above with reference to FIGS. 7 and 8, according to the observation of pixels that fail to be darkened when irradiated with laser light 100, such deposition of fine particles is not observed.

Preferably, the concave portion C has a depth within the range of 0.01 to 1 micrometer. The concave portion C shallower than 0.01 micrometer is not sufficient for preventing the movement of the bubble 120. When the concave portion C is deeper than 1 micrometer, its effect on the gap of the cell (the thickness of the liquid crystal 50) is not negligible.

Note that the bubble 120 produced by irradiation with laser light 100 will subsequently disappear when the irradiation with laser light 100 is stopped and the temperature of the liquid crystal decreases.

Here, the reason for providing a concave portion C in pixels with high relative luminosity is described.

Figure 10:
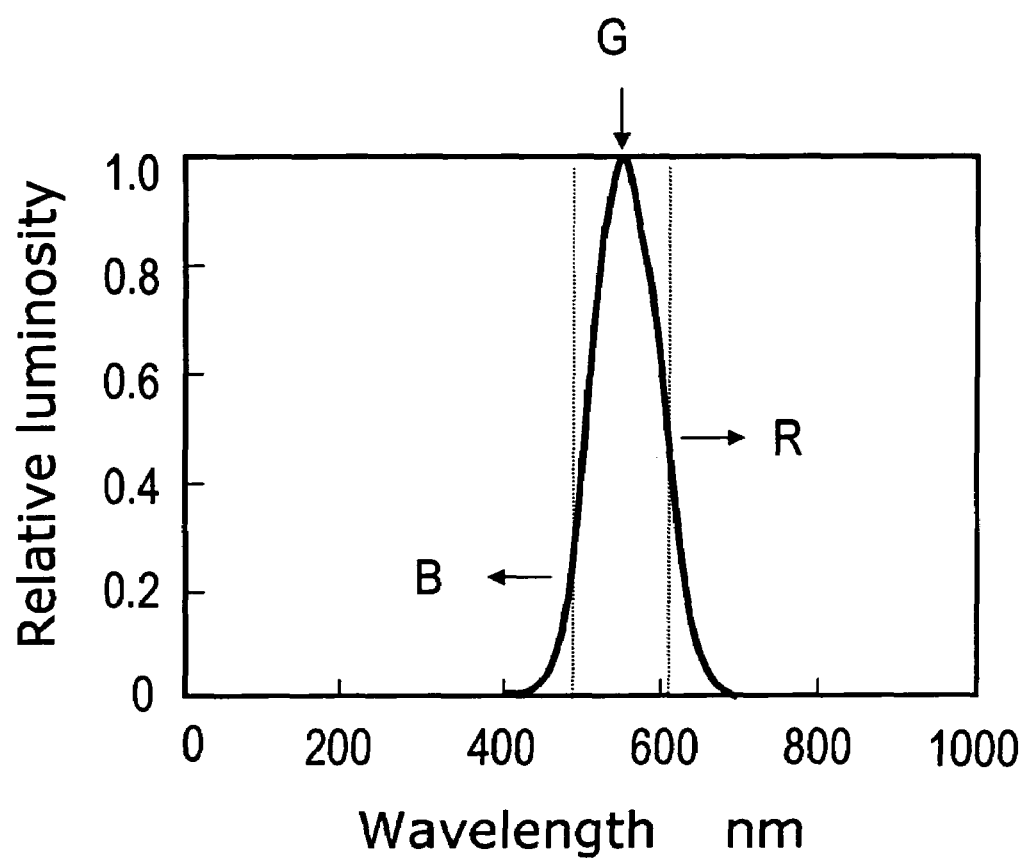
FIG. 10 is a graphical diagram illustrating the relation of the relative luminosity to the wavelength of light.

FIG. 10 is a graphical diagram illustrating the relation of the relative luminosity to the wavelength of light. The "relative luminosity" used herein refers to the sensitivity (luminosity) of the naked eye to light, represented relative to the highest luminosity at a wavelength of 550 nm.

As shown in FIG. 10, the relative luminosity is maximized around a wavelength of 550 nm, that is, green. In this connection, the wavelength around 700 nm is visually perceived as red, and the wavelength around 440 nm as blue. Thus, a bright spot defect is likely to be the most conspicuous when it occurs in a green pixel. In addition, because green is the most perceptible, it is desirable to repair a bright spot defect in a green pixel as completely as possible.

In this respect, according to this embodiment, green pixels, which have the highest relative luminosity, are provided with a concave portion. Thus a bubble formed by irradiation with laser light is fixed, and the overlying and underlying alignment films can be reliably heated, shattered, and deposited. As a result, a liquid crystal panel having bright spot defects can be repaired in the most visually effective manner. This allows for increasing the manufacturing yield of high-definition liquid crystal panels, decreasing the cost, and reducing discarded defectives, thereby reducing the load on the resources and environment as well.

With regard to a method of forming a concave portion C as illustrated in FIG. 1, for example, the green color filter 65G can be formed to have a smaller thickness than the other color filters 65R and 65B. Alternatively, the green color filter 65G can be exclusively concaved by selectively etching the green color filter 65G or by pressing a stamper with corresponding protrusions after forming the color filters 65R, 65G, and 65B.

This embodiment achieves a significant effect also when the surface of the array region 40 and the like is generally planarized, for example. More specifically, one of the recent techniques for enhancing the performance of liquid crystal panels is to enlarge the pixel region using a planarization resin. In this technique, a planarization resin is applied on the interconnect layer, switching elements, and the like to generally planarize the surface thereof, on which a pixel electrode is formed with a large area, thereby enlarging the effective aperture region.

However, in a liquid crystal panel fabricated by this technique, the surface of the array region 40 is planar. Therefore a bubble 120 formed by irradiation with laser light 100 is easy to move. That is, the bubble 120 moves easily because there is no concave portion that prevents the movement of the bubble 120. For this reason, as described above with reference to FIGS. 7 and 8, the bubble 120 escapes from the portion irradiated with laser light 100, and the alignment films and other elements fail to be suitably heated, shattered, and deposited. As a result, the problem of failing to suitably repair defective pixels is made significant.

In contrast, according to this embodiment, the surface of the planarization resin is not planarized completely, but provided with concave portions C as illustrated in FIG. 1 that correspond to pixels with the color of high relative luminosity. Thus the movement of the bubble 120 can be prevented. As a result, bright spot defects can be reliably repaired even for high-definition liquid crystal panels provided with planarization treatment.

Figure 11:
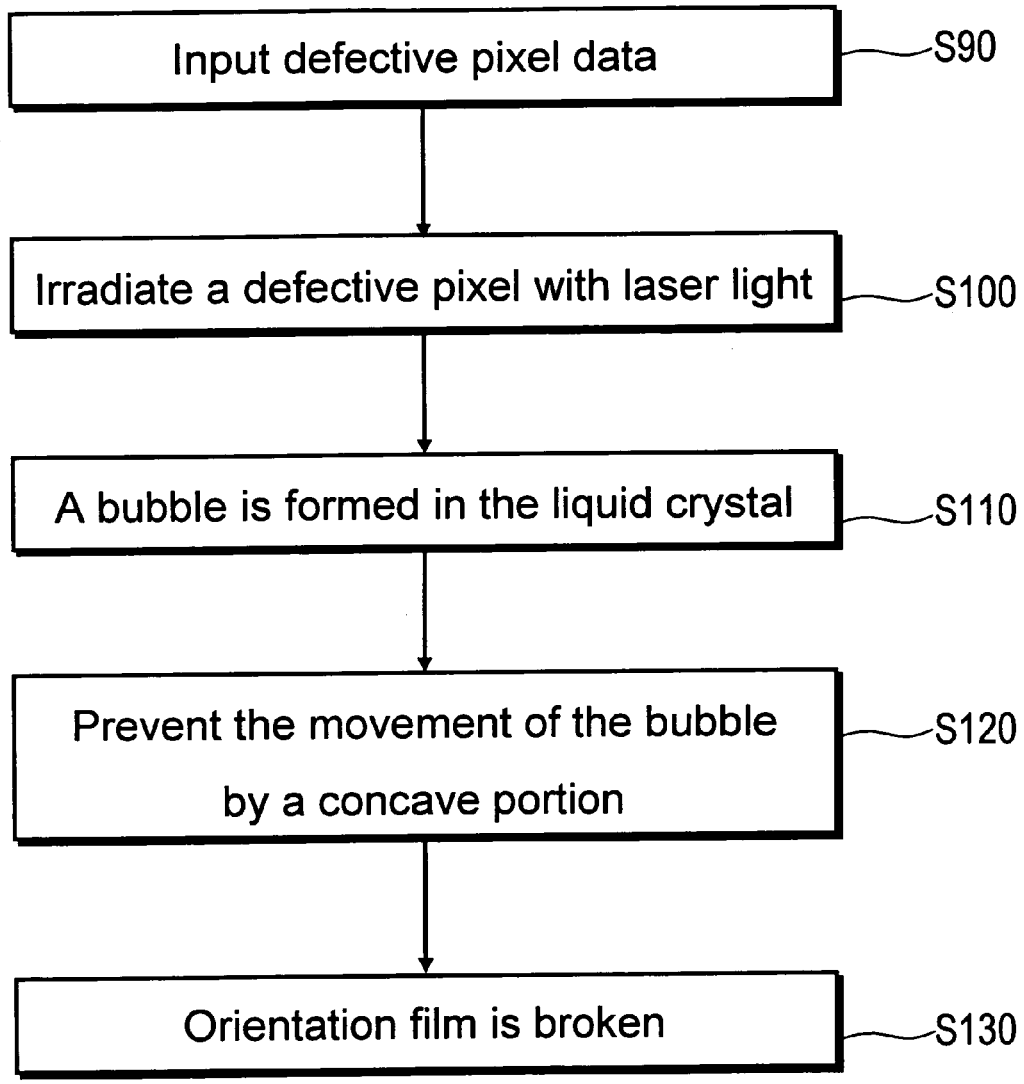
FIG. 11 is a flow chart illustrating another sequence of a method of repairing a liquid crystal panel of the embodiment of the invention.

FIG. 11 is a flow chart illustrating another sequence of a method of repairing a liquid crystal panel of the embodiment of the invention.

More specifically, the basic procedure of this embodiment has an input step of defective pixels data (step S90) before irradiation with laser light to defective pixels (step S100) as described above with reference to the example in FIG. 4. Defective pixels data, for example, indicate positions of defective pixels such as bright spot defects obtained in observations using an LCD (Liquid Crystal Display) inspection apparatus. This makes it possible to identify color pixels having a high luminosity in a shorter time.

In the following, the liquid crystal panel of this embodiment is described in more detail with reference to various examples.

Figure 12:
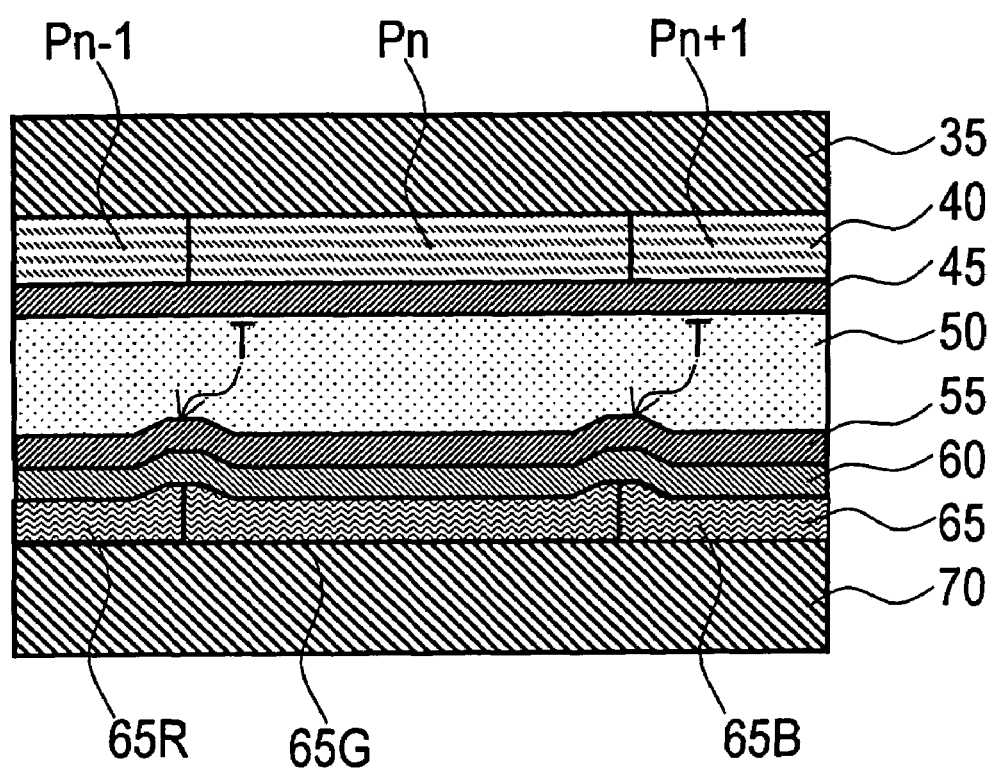
FIG. 12 is a schematic cross section showing a second example of the liquid crystal panel of the embodiment of the invention.

FIG. 12 is a schematic cross section showing a second example of the liquid crystal panel of this embodiment. With regard to FIG. 12 and the following figures, elements similar to those described with reference to the previous figures are marked with the same reference numerals and not described in detail.

In this example, on both edges of the green pixel Pn bordering on the red pixel Pn−1 and the blue pixel Pn+1, the thickness of the pixel 65 is increased to form a pair of protrusions T. The planar configuration thereof can be similar to that described above with reference to FIGS. 2 and 3. This structure of protrusions T corresponding to the contour of the pixel Pn can also stop the movement of a bubble formed in the pixel Pn, thereby reliably repairing the liquid crystal panel.

Preferably, the protrusion T has a height within the range of 0.01 to 1 micrometer as described above with reference to the first example. The protrusion T lower than 0.01 micrometer is not sufficient for preventing the movement of the bubble 120. When the protrusion T is higher than 1 micrometer, its effect on the gap of the cell (the thickness of the liquid crystal 50) is not negligible.

Figure 13:
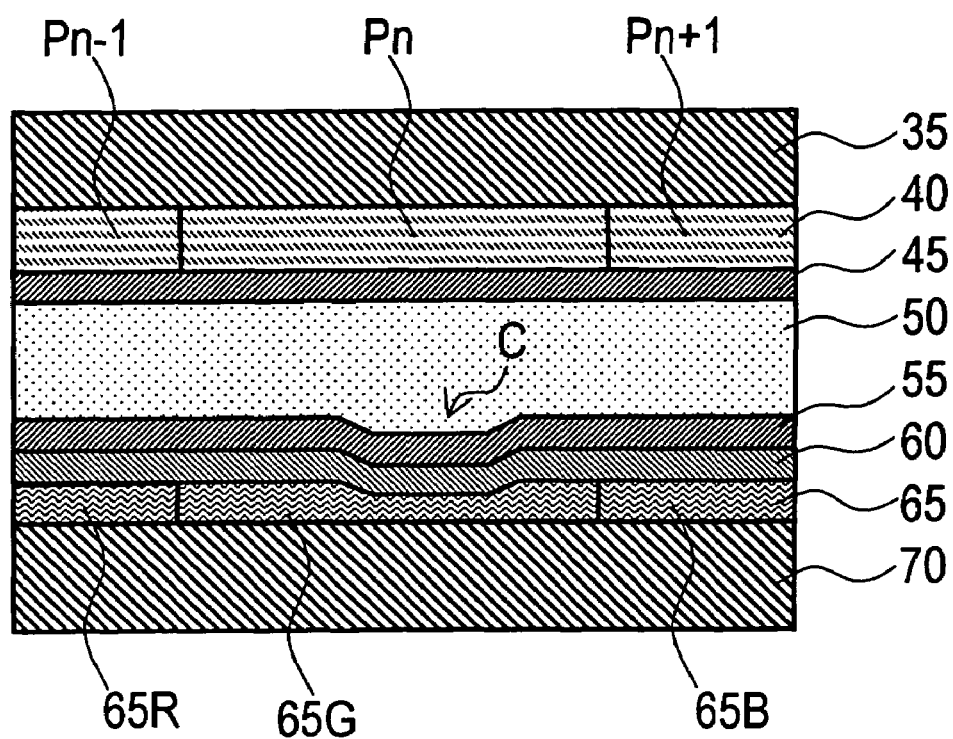
FIG. 13 is a schematic cross section showing a third example of the liquid crystal panel of the embodiment of the invention.

FIG. 13 is a schematic cross section showing a third example of the liquid crystal panel of this embodiment.

More specifically, in this example, a concave portion C having a smaller planar dimension than the green pixel Pn is provided. Such a concave portion C smaller than the pixel can also achieve the effect of preventing the movement of a bubble formed by laser light irradiation. As a result, the repairing process can be reliably carried out. Furthermore, in this example, because the concave portion C is smaller than the pixel Pn, the position of the concave portion C advantageously has an increased margin. That is, even if the concave portion C is formed with a poor positional accuracy and its position is misaligned to some extent, it can still be contained in the intended pixel Pn, which facilitates manufacturing.

Figure 14:
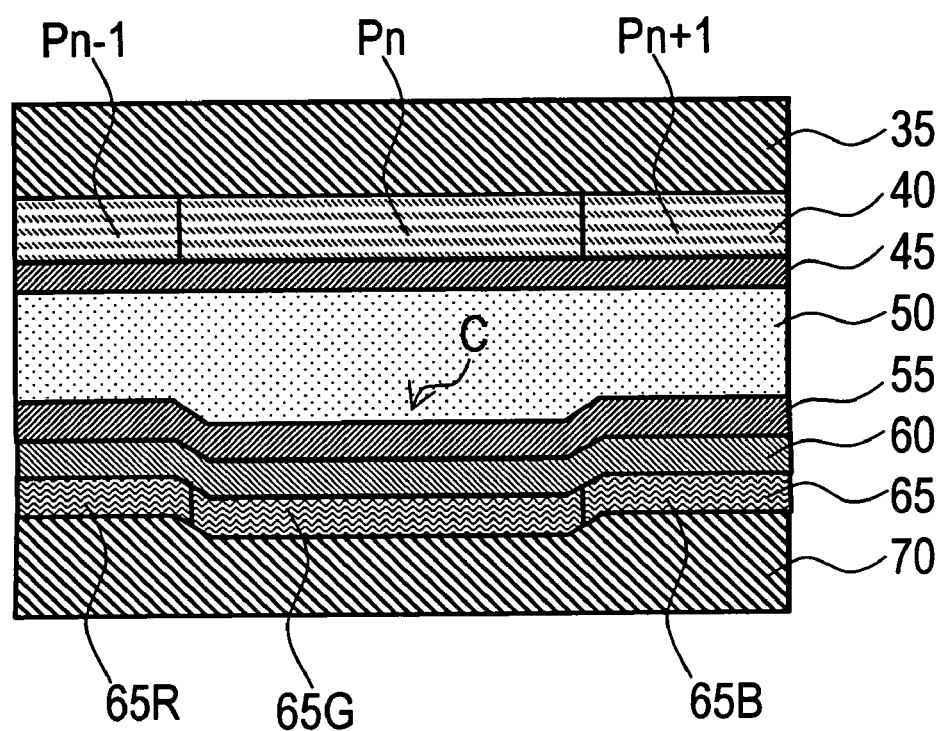
FIG. 14 is a schematic cross section showing a fourth example of the liquid crystal panel of the embodiment of the invention.

FIG. 14 is a schematic cross section showing a fourth example of the liquid crystal panel of this embodiment.

In this example, the glass substrate 70 is locally thinned to provide a concave portion C in the green pixel Pn. Thus a concave portion C can also be formed by controlling the thickness of the glass substrate 70, thereby allowing for a reliable process of repairing by laser light. In this example, the thickness of such elements as the color filter 65 can be equalized across the pixels, which may facilitate the design and manufacturing.

Figure 15:
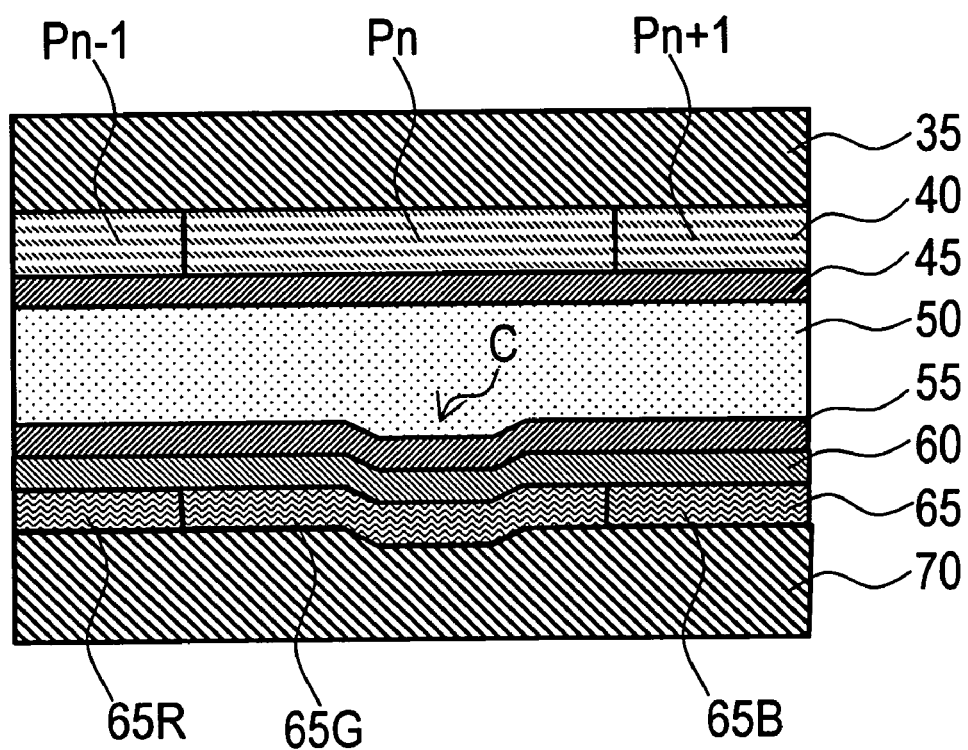
FIG. 15 is a schematic cross section showing a fifth example of the liquid crystal panel of the embodiment of the invention.

FIG. 15 is a schematic cross section showing a fifth example of the liquid crystal panel of this embodiment.

In this example, the glass substrate 70 is locally thinned to provide a concave portion C having a smaller planar dimension than the green pixel Pn. Thus a concave portion C can also be formed by controlling the thickness of the glass substrate 70, thereby allowing for a reliable process of repairing by laser light. In this example again, because the concave portion C is smaller than the pixel Pn, the position of the concave portion C advantageously has an increased margin. That is, even if the concave portion C is formed with a poor positional accuracy and its position is misaligned to some extent, it can still be contained in the intended pixel Pn, which facilitates manufacturing. Furthermore, the thickness of such elements as the color filter 65 can be equalized across the pixels, which may facilitate the design and manufacturing.

Figure 16:
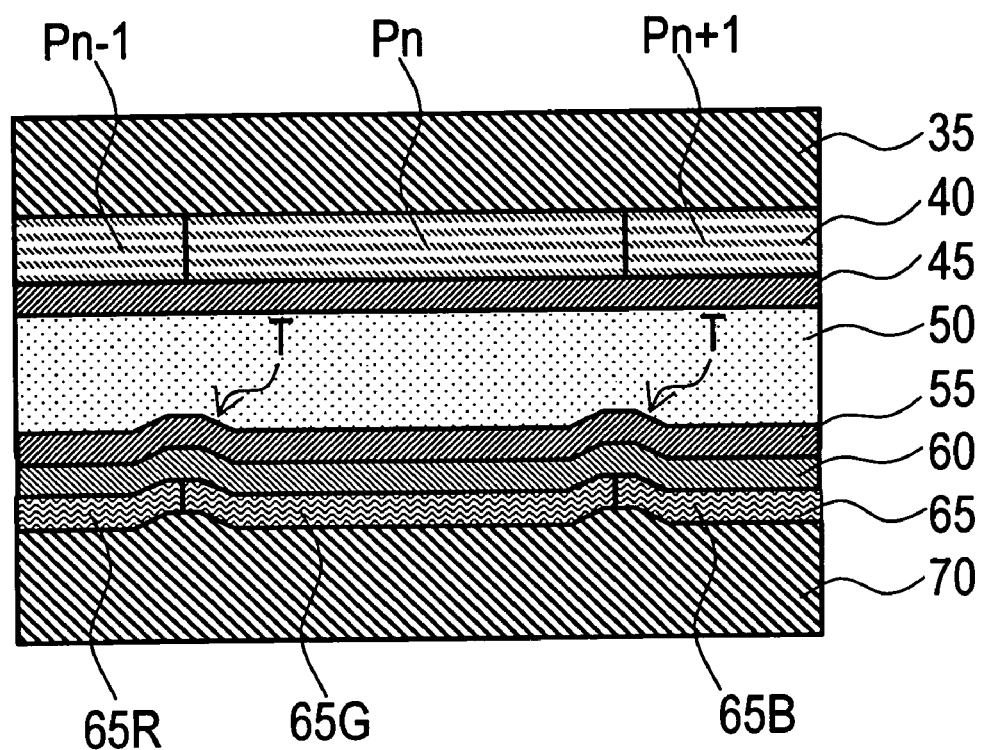
FIG. 16 is a schematic cross section showing a sixth example of the liquid crystal panel of the embodiment of the invention.

FIG. 16 is a schematic cross section showing a sixth example of the liquid crystal panel of this embodiment.

In this example, the glass substrate 70 is locally thickened to form a protrusion T around the green pixel Pn. Thus a protrusion T can also be formed by controlling the thickness of the glass substrate 70, thereby allowing for a reliable process of repairing by laser light. In this example, the thickness of such elements as the color filter 65 can be equalized across the pixels, which may facilitate the design and manufacturing.

Figure 17:
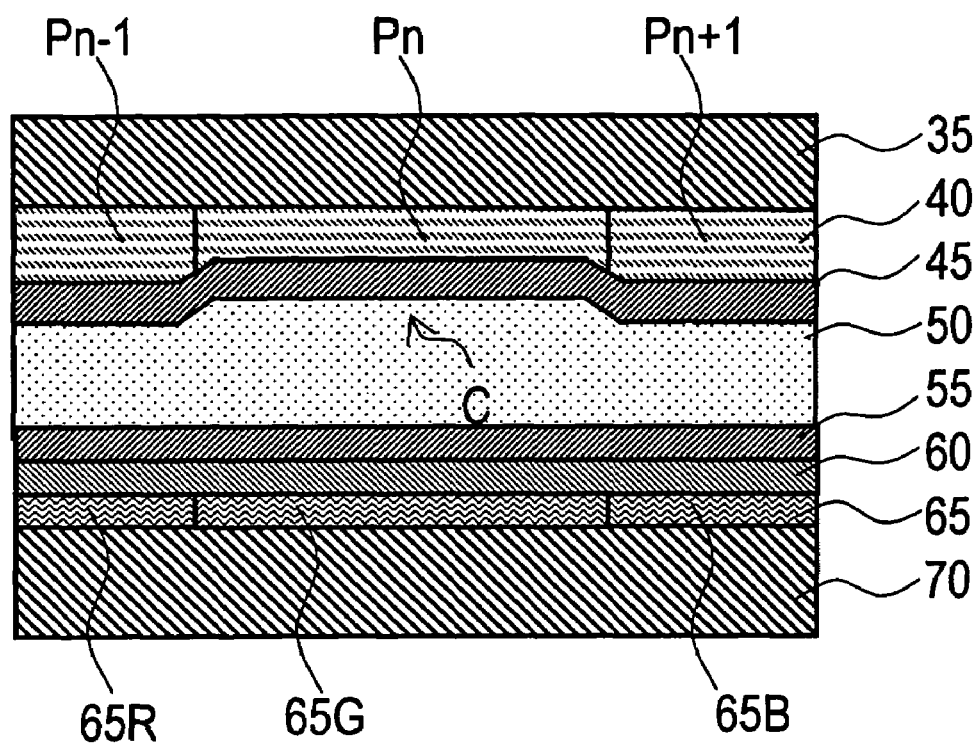
FIG. 17 is a schematic cross section showing a seventh example of the liquid crystal panel of the embodiment of the invention.

FIG. 17 is a schematic cross section showing a seventh example of the liquid crystal panel of this embodiment.

In this example, a concave portion C is formed on the array substrate side. More specifically, a portion of the array region 40 can be thinned to form a concave portion C in the pixel Pn. The array region 40 includes elements not shown such as an interconnect, a TFT or other switching element, a capacitor, an insulating layer, and a planarization layer. Among these elements, for example, the thickness of the insulating layer and the planarization layer can be controlled to form a concave portion C corresponding to the pixel Pn.

Such a concave portion C formed on the array substrate side also allows for preventing the movement of a bubble and reliably carrying out the process of repairing by laser light. Furthermore, in this example, the structure of the opposed electrode side can be the same as the conventional one, which may facilitate the design and manufacturing.

Figure 18:
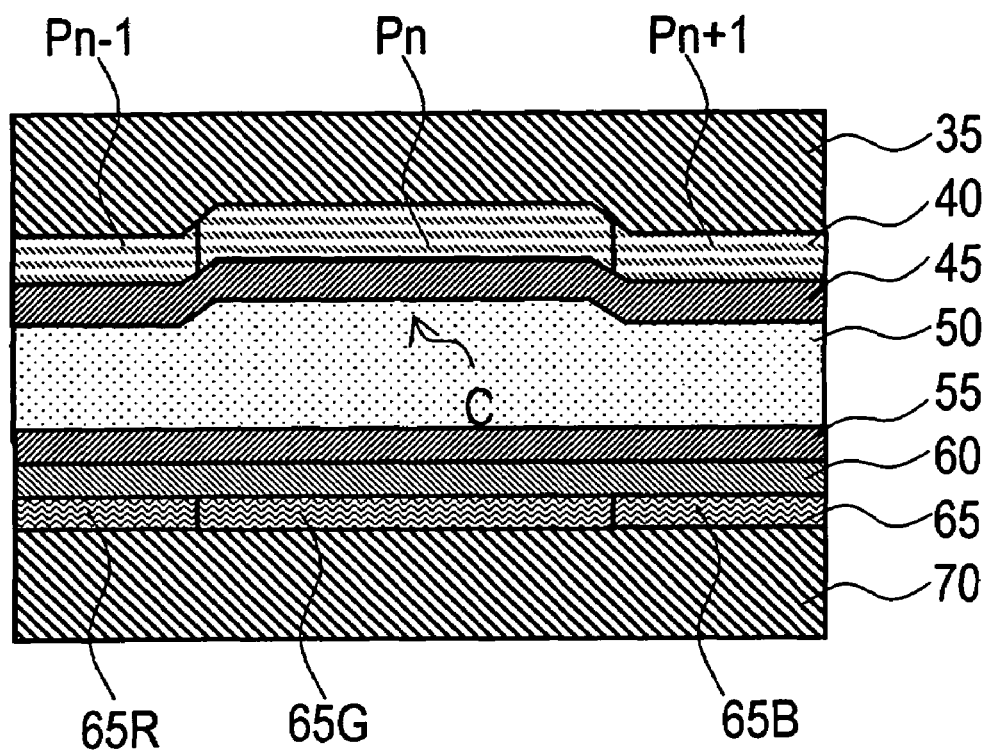
FIG. 18 is a schematic cross section showing an eighth example of the liquid crystal panel of the embodiment of the invention.

FIG. 18 is a schematic cross section showing an eighth example of the liquid crystal panel of this embodiment.

In this example, the glass substrate 35 on the array substrate side is locally thinned to form a concave portion C corresponding to the green pixel Pn. Thus a concave portion C can also be formed by controlling the thickness of the glass substrate 35 on the array substrate side, thereby allowing for a reliable process of repairing by laser light. In this example, the thickness of such elements as the array region 40 and the alignment film 45 on the array substrate side can be equalized across the pixels, which may facilitate the design and manufacturing.

Figure 19:
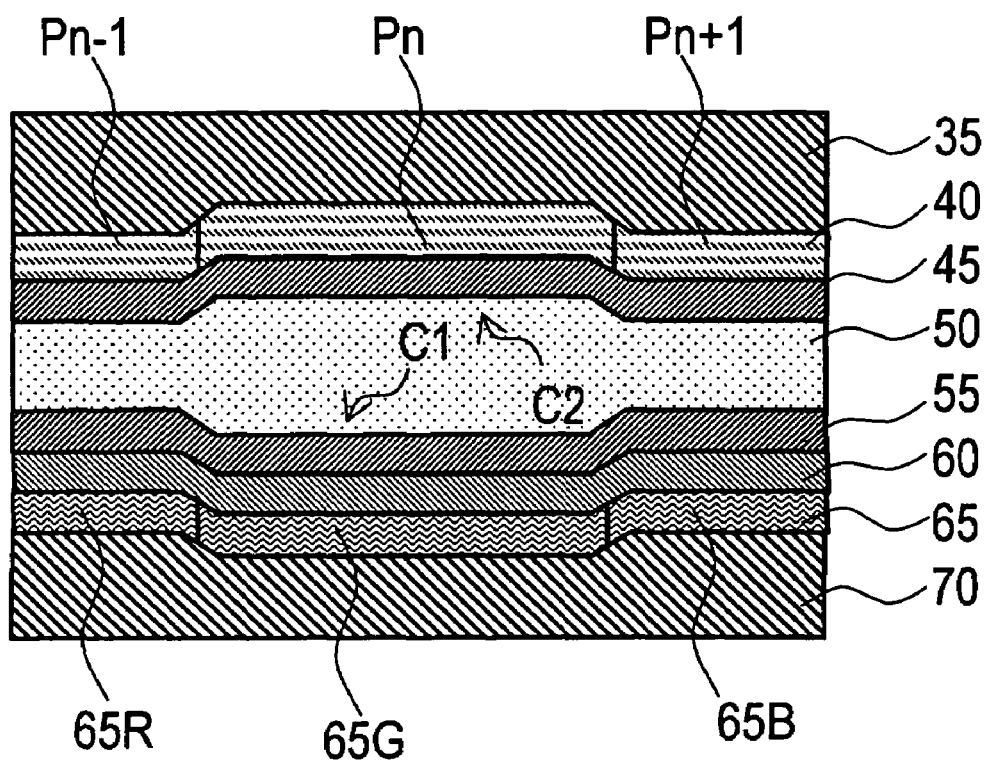
FIG. 19 is a schematic cross section showing a ninth example of the liquid crystal panel of the embodiment of the invention.

FIG. 19 is a schematic cross section showing a ninth example of the liquid crystal panel of this embodiment.

In this example, concave portions are formed both on the opposed electrode side and on the array substrate side. More specifically, the glass substrate 70 is locally thinned to form a concave portion C1 in the green pixel Pn. Furthermore, the glass substrate 35 on the array substrate side is locally thinned to form a concave portion C2 corresponding to the green pixel Pn. Thus the movement of a bubble can be prevented more reliably by providing concave portions C1 and C2 in both substrates sandwiching the liquid crystal 50. As a result, pixels having high relative luminosity can be repaired by laser light more reliably.

Figure 20:
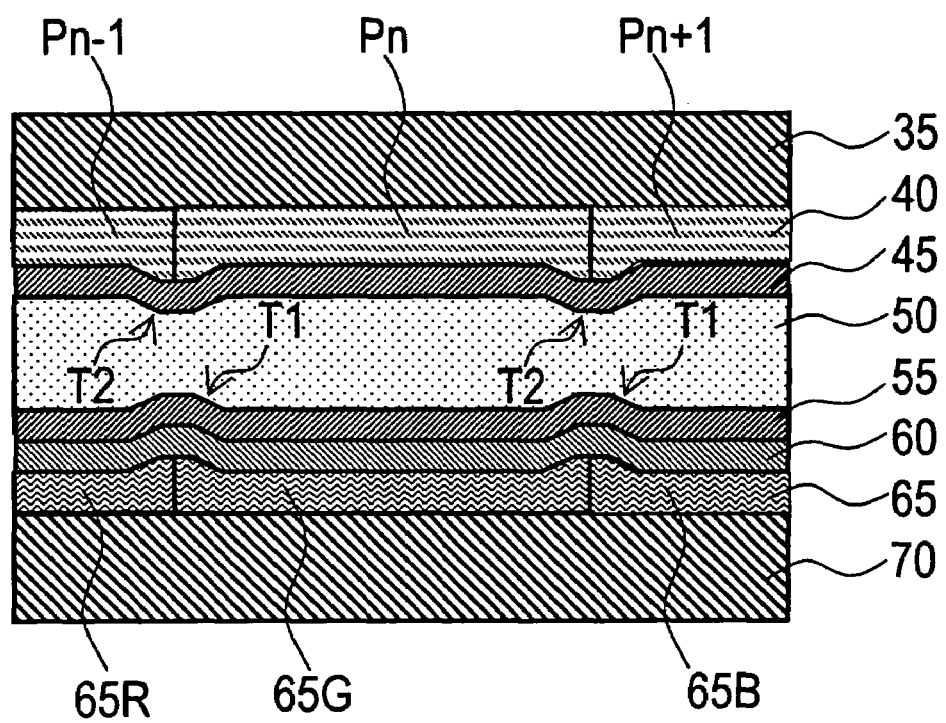
FIG. 20 is a schematic cross section showing a tenth example of the liquid crystal panel of the embodiment of the invention.

FIG. 20 is a schematic cross section showing a tenth example of the liquid crystal panel of this embodiment.

In this example, protrusions are formed both on the opposed electrode side and on the array substrate side. More specifically, the color filter 65 is locally thickened to form a protrusion T1 around the green pixel Pn. Furthermore, the array region 40 on the array substrate side is locally thickened to form a protrusion T2 around the green pixel Pn. Thus the movement of a bubble can be prevented more reliably by providing protrusions T1 and T2 in both substrates sandwiching the liquid crystal 50. As a result, pixels having high relative luminosity can be repaired by laser light more reliably. Note that such protrusions T1 and T2 may be formed by locally thickening the glass substrates 35 and 70 as described above with reference to FIG. 15.

Next, the basic configuration of a repairing apparatus that can be used for repairing a liquid crystal panel of this embodiment is described with reference to an example.

Figure 21:
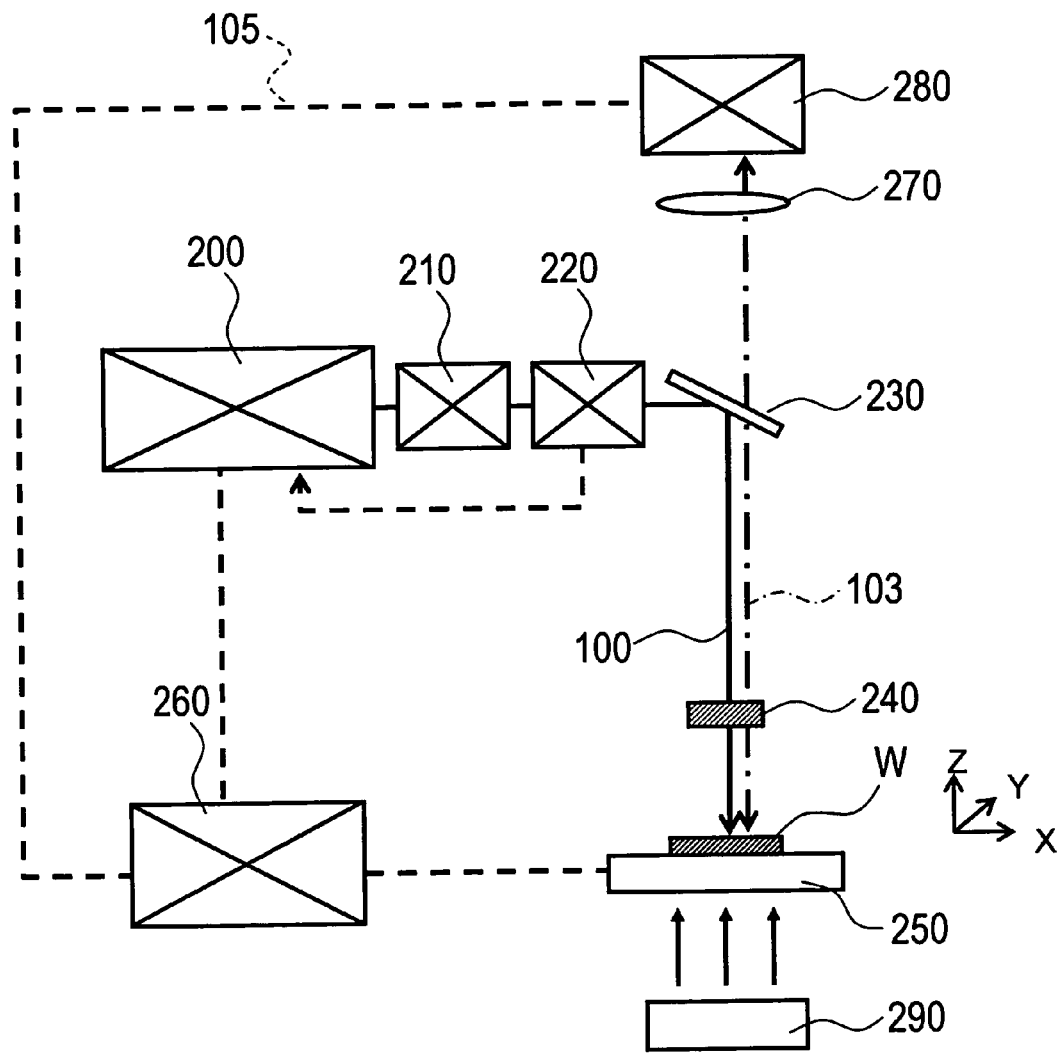
FIG. 21 is a conceptual diagram illustrating the basic configuration of a repairing apparatus that can be used for repairing a liquid crystal panel of the present embodiment.

FIG. 21 is a conceptual diagram illustrating the basic configuration of a repairing apparatus that can be used for repairing a liquid crystal panel of the present embodiment.

The repairing apparatus of this example comprises a laser oscillator 200, an XY stage 250, a controller 260, a CCD camera 280, and a transmitting illumination 290. The laser oscillator 200 outputs laser light 100, which is adjusted by an attenuator 210, monitored by a power monitor 220, modified with respect to its light path by a half mirror 230, converged by a condensing lens 240, and then incident on a liquid crystal panel W mounted on the XY stage 250. Here, the laser light 100 can be scanned on the liquid crystal panel W by moving the XY stage 250. Alternatively, the laser light can be scanned using a movable mirror or movable lens instead of moving the XY stage 250. Irradiation with laser light 100 may not be continuous, but may be intermittent with the irradiation spot being successively displaced.

The transmitting illumination 290 is provided below the XY stage 250. The transmitted optical image of the liquid crystal panel is passed through the condensing lens 240, the half mirror 230, and a relay lens 270 as an image signal 103, and can be observed by the CCD (Charge Coupled Device) camera 280. The operation of these elements is controlled by the controller 260 via a control signal 105.

Figure 22:
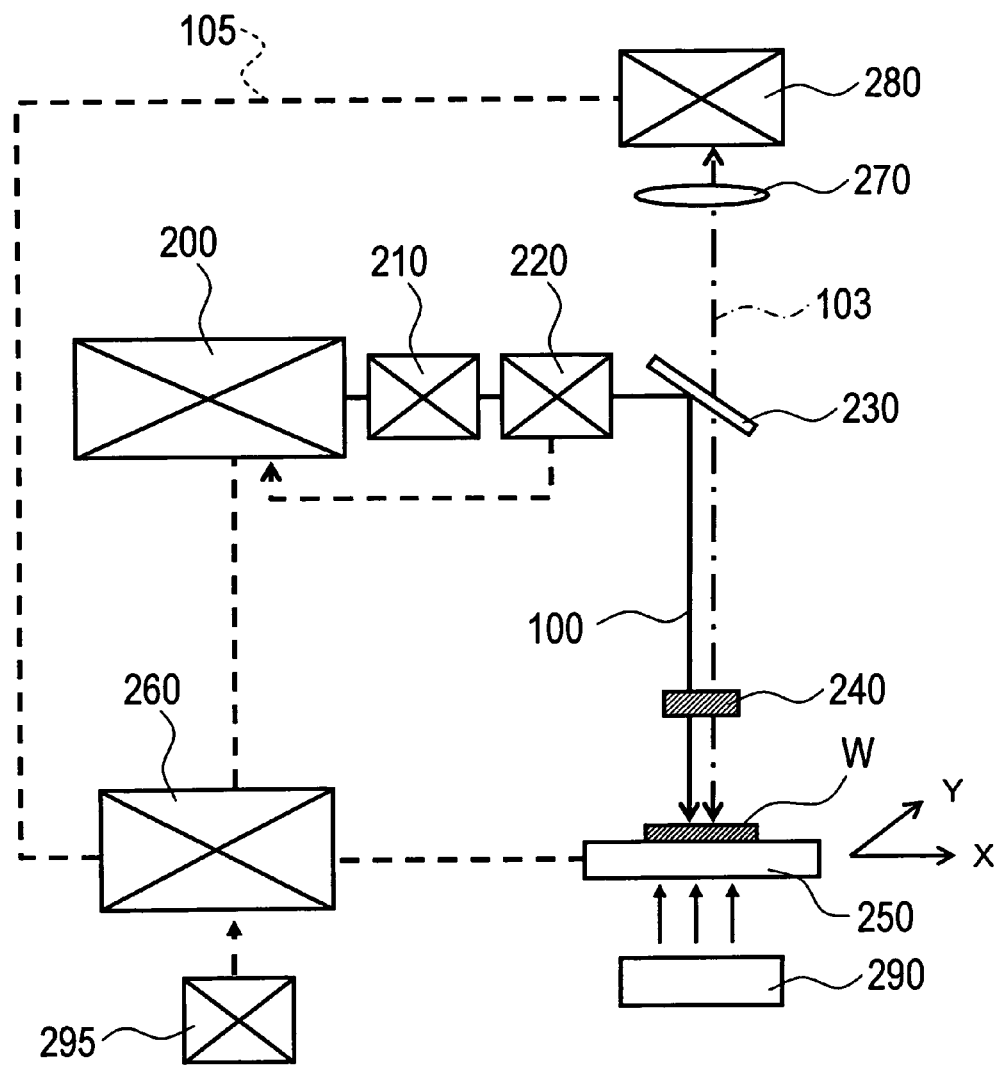
FIG. 22 is a conceptual diagram illustrating the basic configuration of another repairing apparatus that can be used for a method of repairing a liquid crystal panel of the present embodiment.

FIG. 22 is a conceptual diagram illustrating the basic configuration of another repairing apparatus that can be used for a method of repairing a liquid crystal panel of the present embodiment.

The basic structure of the repairing apparatus in the present example is similar to the repairing apparatus described in FIG. 21. However, the tester 295 that inputs defective pixels data is connected to the controller 260. The tester 295 previously inspects defective pixels such as bright spot defects which are included in LCD and outputs their addresses or data about positions such as coordinates to the controller 260. The tester 295 and the controller 260 are either connected directly or data are transferred via media such as magnetic recording media. The embodiment of the repairing apparatus in the present example is possible using the method of repairing of the liquid crystal panel previously described in FIG. 11.

The controller 260 makes the XY stage 250 to move the specified position according to the data which the tester 295 inputs, and prepares for repairing defective pixels instantly. Thereafter, it repairs the liquid crystal panel through the similar operation to the repairing apparatus described in FIG. 21.

According to this embodiment, when the repairing apparatus as described above is used to repair bright spot defects and the like, pixels having high relative luminosity can be reliably darkened. This allows for increasing the manufacturing yield of high-definition liquid crystal panels, decreasing the cost, and reducing the load imposed on the environment as well.

The embodiment of the invention has been described with reference to the examples. However, the invention is not limited to these examples. For example, the pixels in which concave portions or protrusions are provided are not limited to green pixels. When a color filter of a color combination other than the three RGB colors is used, concave portions or protrusions should be formed in pixels having the highest relative luminosity in the color filter.

Furthermore, any elements constituting the liquid crystal panel that are variously adapted by modification and/or addition by those skilled in the art are also encompassed within the scope of the invention as long as they include the features of the invention.

The invention claimed is:

1. A liquid crystal panel-comprising:
a first substrate on which pixels of a plurality of colors are arranged;
a second substrate; and
a liquid crystal sandwiched between the first substrate and the second substrate,
on a surface of at least one of the first and second substrates in contact with the liquid crystal, a protrusion being formed corresponding to the contour of the pixel of a color having the highest relative luminosity among the pixels of the plurality of colors;
wherein the protrusion is formed by locally thickening a color filter;
wherein a concave portion is formed in the pixel of the color having the highest relative luminosity by decreasing the thickness of a glass substrate included in the one of the first and second substrates.

2. A liquid crystal panel comprising:
a first substrate on which pixels of a plurality of colors are arranged;
a second substrate; and
a liquid crystal sandwiched between the first substrate and the second substrate,
on a surface of at least one of the first and second substrates in contact with the liquid crystal, a protrusion being formed corresponding to the contour of the pixel of a color having the highest relative luminosity among the pixels of the plurality of colors;
wherein the protrusion is formed by locally increasing the thickness of a glass substrate included in the one of the first and second substrates.

3. A method of repairing a liquid crystal panel, the liquid crystal panel including a first substrate on which pixels of a plurality of colors are arranged, a second substrate, and a liquid crystal sandwiched between the first substrate and the second substrate, wherein, on a surface of at least one of the first and second substrates in contact with the liquid crystal, a concave portion or a protrusion is formed in at least a portion of the pixel of a color having the highest relative luminosity among the pixels of the plurality of colors, the method comprising:
irradiating the pixel of the color having the highest relative luminosity with a laser light to disturb the orientation of the liquid crystal;
irradiating the pixel of the color having the highest relative luminosity with the laser light to disturb the orientation of the liquid crystal;
wherein the orientation of the liquid crystal in the pixel of the color having the highest relative luminosity is disturbed while a bubble produced in the liquid crystal by irradiation with the laser light is retained in the concave portion or the protrusion.

4. A method of repairing a liquid crystal panel, the liquid crystal panel including a first substrate on which pixels of a plurality of colors are arranged, a second substrate, and a liquid crystal sandwiched between the first substrate and the second substrate, wherein, on a surface of at least one of the first and second substrates in contact with the liquid crystal, a concave portion or a protrusion is formed in at least a portion of the pixel of a color having the highest relative luminosity among the pixels of the plurality of colors, the method comprising:
irradiating the pixel of the color having the highest relative luminosity with a laser light to disturb the orientation of the liquid crystal;
irradiating the pixel of the color having the highest relative luminosity with the laser light to disturb the orientation of the liquid crystal;
wherein repairing is carried out by using a laser oscillator configured to emit the laser light, a stage configured to fix the liquid crystal panel, an optical system configured to guide the laser light to the liquid crystal panel, and controller configured to control the laser oscillator, the stage and the optical system.

5. A method of repairing a liquid crystal panel according to claim 4, wherein the repairing is carried out further by using an observing part configured to observe defective pixels having the bright spot defects, and the observing part is also controlled by the controller.

6. A method of repairing a liquid crystal panel according to claim 4, wherein an address or a position information is inputted to the controller.

* * * * *